UNITED STATES PATENT OFFICE.

LOUIS H. G. EHRHARDT, OF PHILADELPHIA, PENNSYLVANIA, ASSIGNOR OF ONE-HALF HIS RIGHT TO JOSEPH R. CARPENTER, OF SAME PLACE.

IMPROVEMENT IN PROCESSES OF EXTRACTING PRINTER'S INK FROM RAGS.

Specification forming part of Letters Patent No. 172,721, dated January 25, 1876; application filed December 22, 1875.

*To all whom it may concern:*

Be it known that I, LOUIS H. G. EHRHARDT, of the city and county of Philadelphia and State of Pennsylvania, have invented a new and useful Process of Extracting Printer's Ink from Rags, and cleansing the same; and I do hereby declare the following to be a clear and exact description of the nature thereof, sufficient to enable others skilled in the art to which my invention appertains to fully understand, make, and use the same.

In order to obtain the ink contained in the rags in such a state as to be fit or suitable for either the use of printing or painting, I soften the rags by placing them for a short period in linseed-oil, and then express, by a wringer or other suitable means, the ink and other fluid substances contained in the rags. I next immerse the rags in turpentine to soften the remaining substances, express the fluids, and then place the rags in an alkaline bath to saponify the little remaining oil. After washing the rags, or rinsing them in several waters, I place them in diluted sulphuric or muriatic acid, for the purpose of removing the dust, which is insoluble in water. Then again rinse the rags in cold or warm water to remove traces of the acid, dry them, and they are ready for use.

The expressed ink that falls from the wringer into the linseed-oil combines therewith and forms an ink again serviceable for plate-printing purposes.

The expressed ink that falls from the wringer into the turpentine forms an ink serviceable for painting purposes.

Having thus described my invention, what I claim as new, and desire to secure by Letters Patent, is—

The herein-described process of extracting printer's ink from rags, and cleansing them, the same consisting in softening the rags by linseed-oil, expressing the ink, next treating them with turpentine and expressing the ink, then subjecting them to an alkaline bath and to a wash of clean water, and afterward treating them with acid to remove the dust, as set forth.

L. H. G. EHRHARDT.

Witnesses:
    JOHN A. WIEDERSHEIM,
    H. E. HINDMARSH.